(12) United States Patent
Rademacher

(10) Patent No.: US 6,804,727 B1
(45) Date of Patent: Oct. 12, 2004

(54) METHOD FOR COMMUNICATION FROM A HOST COMPUTER TO A PERIPHERAL DEVICE

(75) Inventor: Timothy John Rademacher, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 598 days.

(21) Appl. No.: 09/792,632

(22) Filed: Feb. 23, 2001

(51) Int. Cl.[7] ............................................. G06F 13/00
(52) U.S. Cl. ........................... 710/9; 710/8; 710/305; 713/1; 713/202; 714/25
(58) Field of Search .................... 710/9, 8, 63, 300, 710/305; 713/201, 202, 1, 300; 705/80; 709/217, 225, 227, 203, 220; 358/1.1, 448, 530; 700/90, 213–215; 714/25; 345/700

(56) References Cited

U.S. PATENT DOCUMENTS

| | | | |
|---|---|---|---|
| 4,634,807 A | * 1/1987 | Chorley et al. | ............... 705/55 |
| 4,773,005 A | * 9/1988 | Sullivan | ........................ 710/9 |
| 5,247,623 A | 9/1993 | Sun | |
| 5,363,134 A | 11/1994 | Barbehenn et al. | |
| 5,412,576 A | * 5/1995 | Hansen | ........................ 700/104 |
| 5,497,450 A | 3/1996 | Helmbold et al. | |
| 5,692,111 A | 11/1997 | Marbry et al. | |
| 5,696,894 A | 12/1997 | Ono | |
| 5,720,015 A | 2/1998 | Martin et al. | |
| 5,757,394 A | 5/1998 | Gibson et al. | |
| 5,794,032 A | * 8/1998 | Leyda | ........................... 713/2 |
| 5,832,191 A | 11/1998 | Thorne | |
| 5,905,906 A | 5/1999 | Goffinet et al. | |
| 6,178,298 B1 | * 1/2001 | Nagatani | ...................... 399/79 |
| 6,552,814 B2 | * 4/2003 | Okimoto et al. | ........... 358/1.13 |
| 6,629,134 B2 | * 9/2003 | Hayward et al. | ........... 709/217 |
| 6,704,824 B1 | * 3/2004 | Goodman | .................... 710/300 |

OTHER PUBLICATIONS

"IEEE standard signaling method for a bidirectional parallel peripheral interface for personal computers" in IEEE std 1284–1994 on Dec. 2, 1994.*

* cited by examiner

*Primary Examiner*—Gopal C. Ray
(74) *Attorney, Agent, or Firm*—Taft, Stettinius & Hollister LLP

(57) ABSTRACT

A method for communicating, a host computer to a peripheral device (such as a USB device) may include the steps of: (a) coupling the peripheral device to the host computer; (b) transmitting a unique identification code from the peripheral device to the host computer; (c) accessing from memory by the host computer an identification string corresponding to the unique identification code, where the identification string was previously entered by a user of the host computer during an initialization process for the peripheral device; and (d) displaying at least a portion of the identification string on a user interface of the host computer. Thereafter, a user may select the peripheral device by activating an item associated with the portion of the identification string on the user interface of the host computer.

34 Claims, 7 Drawing Sheets

METHOD FOR COMMUNICATION FROM A HOST COMPUTER TO A PERIPHERAL DEVICE

BACKGROUND

The present invention involves a method for communicating a host computer to a peripheral device, and specifically, a method for configuring a USB (Universal Serial Bus) device to a USB host.

The Universal Serial Bus (USB) is intended to be in an industry-standard extension to the PC architecture that is designed to support data exchange between a host computer and a wide range of simultaneously accessible peripherals. The attached peripherals share USB bandwidth through a host-scheduled, token-based protocol. The bus allows peripherals to be attached, configured, used, and detached while the host and other peripherals are in operation.

The USB connects USB devices with the USB host. Standard USB devices include USB hub devices, USB peripheral devices and USB peripheral devices that are also USB hub devices. The USB physical interconnect is a tiered star topology. A USB hub is at the center of each star. Each USB wire segment is a point-to-point connection between the host and the hub or peripheral, or a hub connected to another hub or peripheral. There is only one host in any USB system. The USB interface to the host computer system is referred to as the host controller, where the host controller may be implemented in a combination of hardware, firmware, or software. A root hub is integrated within the host system to provide one of more USB attachment points.

USB hubs provide additional attachment points to the USB system. USB peripherals provide capabilities to the system, such as a keyboard, monitor, printer, etc.

USB hubs are wiring concentrators and enable the multiple attachment characteristics of the USB. Attachment points are referred to as ports. Each hub converts a single attachment point into multiple attachment points. The USB architecture supports concatenation of multiple hubs. The upstream port of a hub connects the hub towards the host, while each downstream port of a hub allows connection to another hub or peripheral. Hubs can detect attachments and detachments at each downstream port and enable the distribution of power to the downstream devices.

A USB peripheral is able to transmit or receive data or control information over the bus. A peripheral is typically implemented with a USB cable that plugs into a USB port on a USB hub. However, a physical package may implement multiple peripherals and an embedded hub with a single USB cable. This is known as a compound device, which appears to the host as a USB hub with one or more non-removable USB devices.

Each peripheral contains configuration information that describes its capabilities and resource requirements to the USB host. Before a peripheral can be used, it must first be configured by the host. This configuration includes allocating USB bandwidth in selecting function-specific configuration options. To assist the host in identifying and configuring such USB peripherals, each peripheral carries and reports configuration-related information to the USB host. Some of the information reported is common among all logical devices, while other information is specific to the functionality provided by the particular USB peripheral.

USB devices (peripherals and/or hubs) report their attributes to the USB host using descriptors. A descriptor is a data structure with a defined format and describes general information to the USB host about the attached USB device. It includes information that applies globally to the USB device and all of the device's configurations. Fields included within the standard device descriptor will include a Product ID assigned by the manufacturer ("idProduct"), a Vendor ID assigned by USB ("idVendor"), an index to a String Descriptor which describes the manufacturer ("iManufacturer"), an index to a String Descriptor describing the product ("iProduct") and an index to a String Descriptor describing the device's serial number ("iSerialNumber"). For more detailed information on the Universal Serial Bus refer to the Universal Serial Bus Revision 2.0 specification, available on-line at www.usb.org/developers/docs.html.

Presently, USB can support up to 127 devices on a single bus. Therefore, multiple printers of the same model may be attached to a single USB. It is desirable, therefore, to have such printers identify themselves over the USB so that the user can select which of the printers is to be used for a particular printer job. While the serial number may be a conventional way to identify the printer to the user, such a number might not be easily understandable by the user or to other users that may use the system at a later time. Furthermore, adding the serial number to the printer involves another step in the manufacturing process, which may undesirable increase the costs and complexity of the printer.

Accordingly, there is a need to provide a easy and convenient way for a user to incorporate multiple peripheral devices (such as printers) into a USB system where such multiple USB devices are easily identifiable by the user.

SUMMARY

The present invention provides a method for communicating a host computer to a peripheral device; and more particularly, a method for configuring a USB device (such as a USB printer) to a USB host device (such as a PC). One advantageous feature that the method of the present invention provides is that it allows the USB host to identify between multiple USB devices; and therefore, allows the user to easily identify and select from between multiple of USB connected devices.

A specific feature of the present invention allows the user to enter a user-defined description for the USB device the first time the USB device is plugged into the host computer. The identification could be the serial number or a descriptive string, such as "printer on the shelf." The identification is preferably stored in non-volatile memory in the USB device, either in flash memory or EEPROM. This non-volatile memory is initialized during manufacturing of the USB device in a manner such that the USB host driver knows that the user has not assigned an identification string to the USB device the first time it is connected to the USB host. Upon initial communication with the USB device, the USB host driver will prompt the user for an identification string. The driver may also provide a method for changing the identification string if, for example, the user moves the "printer on the shelf" from the shelf to another part of his or her office such as a desk.

As an alternative to storing the identification string on the USB device, the USB device could send any unique identifier to USB host and the USB host could then associate the user assigned string with the USB device's unique identifier. One source of unique identification numbers available to a printer is a temperature sensor, such as a Dallas Semiconductor® sensor commonly used in Lexmark® Ink Jet Printers. The number provided by the sensor would be meaningless to the USB host unless it was first associated with some other identifier. The USB host could prompt for an identifier as soon as an unknown printer was connected to the USB system. The device driver for the printer would present a prompt to the user, such as "enter an identification string for the printer that was just connected to the USB." If multiple unknown USB printers are detected at system boot, the device driver for the printers could ask that all but one of the printers be disconnected and then sequentially reconnected one-at-a-time while their respective identifiers are entered.

Another possible source of a unique identifier on a USB printer is in the printhead memory module. The printhead memory module may be written with the date of manufacture and could also contain a value that is incremented for each printhead manufactured on a given day. This combination of the date and daily build number would create a unique identifier.

Accordingly, it is one aspect of the present invention to provide a method for communicating a host computer to a peripheral device that includes the steps of: (a) coupling the peripheral devices to the host computer; (b) transmitting a unique identification code from the peripheral device to the host computer; (c) accessing from memory by the host computer an identification string corresponding to the unique identification code, the identification string being previously entered by a user of the host computer during an initialization process for the peripheral device; and (d) displaying at least a portion of the identification string on a user interface of the host computer, where the user may select the peripheral devices by activating an item (such as an icon, menu item, link, etc.) associated with the portion of the identification string displayed on the user interface.

This unique identification code could be a serial number taken from a component of the peripheral device, such as a printhead installed in a printer or a heat sensor installed in a printer. This unique identification code may also be calculated according to some random number generation scheme. For example, a time lapse between power application to the peripheral device and a second, user initiated event detected by the peripheral device can provide a number of sufficient randomness for use as the unique identification code. This second, user initiated event could be a user activating a power-on-switch on the peripheral device or some other switch on the peripheral device, such as activating a form feed button on a printer.

The method may also include the steps of, prior to the step of transmitting unique identification code from the peripheral device to the host computer: (i) testing, by the peripheral device, a location assigned for the unique identification code in a nonvolatile memory of the peripheral devices; (ii) upon determining that the assigned location includes a predefined invalid identification code, generating the unique identification code by the peripheral device; and (iii) placing the unique identification code in the assigned location of the nonvolatile memory by the peripheral devices. As discussed above, the step of generating the unique identification code may include a step of taking a serial number from a component of the peripheral device, or the steps of calculating the unique identification code according to a time lapse between the first event in a peripheral device and a second, user initiated event detected by the peripheral device.

With the above method, the initialization process preferably includes the steps of: (1) transmitting a unique identification code from the peripheral device to the host computer; (2) checking, by the host computer, for an identification string corresponding to the unique identification code in a memory of the host computer; (3) responsive to not finding an identification string corresponding to the unique identification code in the checking step, prompting a user to enter into the host computer an identification string corresponding to the peripheral devices (such as "printer on shelf"); and (4) storing at least a portion of the identification string entered by the user into the memory of the host computer and corresponding the portion of the identification string stored into the memory with the unique identification code.

This step of prompting the user to enter into the host computer an identification string may include the step of providing a suggested identification string by the host computer to the user. This suggested identifier string could include a product name, a product type or class, and/or at least a portion of the unique identification code (such as the serial number).

It is a further aspect of the present invention to provide a method for communicating a unique identification number from a peripheral device to a host computer that includes the steps of: (a) copying at least a portion of a serial number from a component in the peripheral device; and (b) transmitting the copied portion of the component serial number to the host computer. Preferably, this method includes the step of storing the copied portion of the component serial number in a nonvolatile memory of the peripheral device, and the transmitting step includes the step of accessing the copied portion of the component serial number from the nonvolatile memory. In one embodiment, the peripheral device may be a printer and the component may be a printhead or a sensor contained in the printer.

It is yet another aspect of the present invention to provide a method for communicating an identification number from a peripheral device to a host computer that includes the steps of: (a) measuring a time lapse between a first event in the peripheral devices and a second, user-initiated event detected by the peripheral device; (b) calculating an identification number from the measured time lapse; and (c) transmitting the identification number from the peripheral device to the host computer. This first event may be power application to the peripheral device and the second, user initiated event may include the step of a user activating a power-on switch on the peripheral device. Another example of a second, user initiated event could be when a user activates a form feed switch on a printer.

It is yet another aspect of the present invention to provide a method for configuring a USB device to a USB host that comprises the steps of: (a) operatively coupling the USB device to the USB host with at least one USB connection; (b) responsive to a USB host device descriptor request to the USB device, the USB device transmitting a unique identification code in a serial-number field of a device descriptor response to the USB host device; (c) accessing from memory an identification string corresponding to the unique identification code, the identification string being previously entered by a user; and (d) displaying at least a portion of the identification string on a user interface operatively coupled to the USB host device along with an item, for activation by a user, from which the user may select the USB device. This unique identification code may be, for example, a serial number taken from a component of the USB device or calculated from a time lapse between a first event in the USB device and a second, user initiated event detected by the USB device.

This method may also include the steps of, prior to the step of transmitting a unique identification code in a serial number field of a device descriptor response to the USB host device: (1) testing, by the USB device, a location assigned for the unique identification code in a nonvolatile memory of the USB device; (2) upon determining that the assigned location includes a pre-defined invalid identification code, generating the unique identification code by the USB device; and (3) placing the unique identification code in the assigned location of the nonvolatile memory by the USB device.

In the above method, the identification string may be provided by a user during an initialization process for the USB device, where the initialization process includes the steps of: (1) transmitting a unique identification code from the USB device to the USB host; (2) checking, by the USB host, for an identification string corresponding to the unique identification code in a memory accessible by the USB host; (3) responsive to not finding an identification string corresponding to the unique identification code in the checking step, prompting a user to enter into a user interface an identification string corresponding to the USB device; and (4) storing at least a portion of the identification string entered by the user into the memory accessible by the USB host and corresponding the portion of the identification string stored into the memory with the unique identification code.

It is yet another aspect of the present invention to provide a method for configuring a USB device to a USB host that includes the steps of: (a) operatively coupling the USB device to the USB host with at least one USB connection; and (b) responsive to the USB host descriptor request to the USB device, the USB device copying at least a portion of a serial number from a component in the USB device, and transmitting the copied portion of the component serial number in a serial number field of a device descriptor response to the USB host. This method may also include the step of storing the copied portion of the component serial number in a nonvolatile memory of the USB device, where the step of transmitting the copied portion of the component serial number in a serial number field of a device descriptor response to the USB host may include the step of accessing the copied portion of the component serial number from the nonvolatile memory of the USB device.

It is yet another aspect of the present invention to provide a method for configuring a USB device to a USB host that includes the steps of: (a) operatively coupling the USB device to the USB host with at least one USB connection; and (b) responsive to a USB host descriptor request to the USB device, the USB device performing the steps of: (1) measuring a time lapse between the first event in the USB device and a second, user-initiated event detected by the device; (2) calculating an identification number from the measured time lapse; and (3) transmitting the identification number in a serial number field of a device descriptor response to the USB host. This first event may be, for example, a power application to the USB device; and the user initiated event may be, for example, a step of a user activating a switch on the USB device (such as a power on switch or a form feed switch).

Therefore, it is an object of the present invention to provide a relatively simple and convenient method for a user to incorporate a peripheral device (such as a USB peripheral device) into a system (such as a USB system), where the peripheral device will include a user-defined identification string selectable by the user when the peripheral device is to be activated or selected. It is also an object of the present invention to provide a method for allowing a user to distinguish between multiple peripheral devices coupled to a single host, even when some of the multiple peripheral devices are identical (or nearly identical) devices. It is also an object of the present invention to provide a method for a peripheral device to generate a unique identification number or string, so as to allow a host device to differentiate the peripheral device from other peripheral devices coupled to the host. These and other objects and advantages of the present invention will be apparent from the following description, the attached drawings and the appended claims.

DETAILED DESCRIPTION

Figure 1:
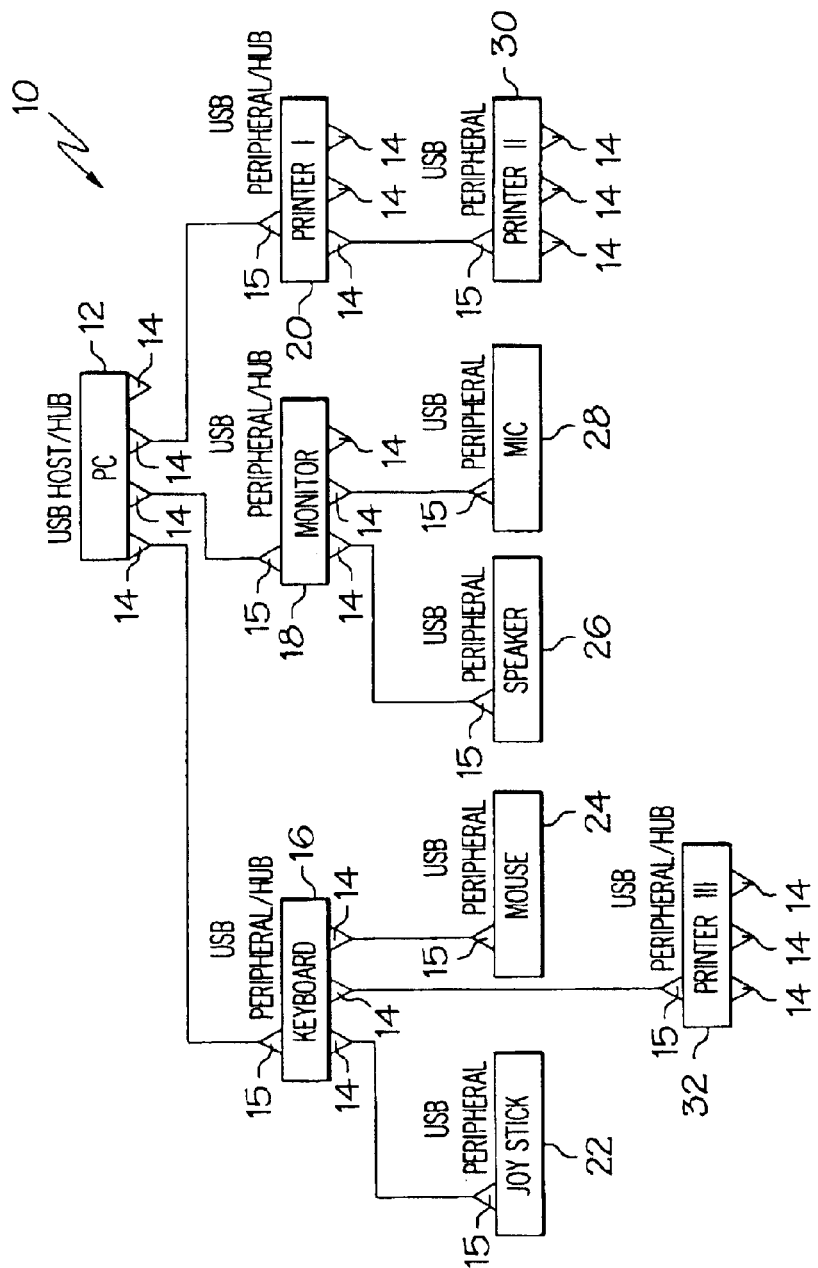
FIG. 1 is a schematic, block-diagram representation of an exemplary USB system according to the present invention.

As shown in FIG. 1, an example of a USB system will include a USB host/hub such as a PC computer 12, which has a plurality of the downstream USB ports 14, and a plurality of USB peripheral devices, USB hub devices and/or combination USB peripheral and hub devices operatively connected to the PC 12. In the present example, the system includes a USB keyboard 16 coupled to the PC 12 via an upstream USB port 15, where the keyboard 16 is a USB peripheral/hub having a plurality of downstream USB ports 14; a USB monitor 18, which is a USB peripheral/hub, connected to the PC 12 via an upstream USB port and having a plurality of downstream USB ports 14; a first USB printer 20, which is a USB peripheral/hub, connected to the PC 12 via an upstream USB port and having a plurality of downstream USB ports 14; a USB joystick 22, which is a USB peripheral, connected to the USB keyboard 16 via an upstream USB port 15; a USB mouse 24, which is a USB peripheral, connected to the USB keyboard via an upstream USB port 15; a USB speaker 26, which is a USB peripheral, connected to the USB monitor 18 via an upstream USB port 15; a USB microphone 28, which is a USB peripheral, connected to the USB monitor via an upstream USB port 15; a second USB printer 30, which is a USB peripheral/hub having a plurality of downstream USB ports 14, connected to the first USB printer via an upstream USB port 15; and a third USB printer 32, which is a USB peripheral/hub having a plurality of downstream USB ports 14, connected to the USB keyboard 16 via an upstream USB port 15.

In the present USB system 10, assuming each of the USB printers 20, 30, 32 are identical products, the user at the PC 12 needs a way to differentiate between the three printers when configuring a specific print job.

During configuration of the printers, the USB printers may return an index to a serial number string ("iSerialNumber") in their standard device descriptor. To support the plurality of the same devices on a single USB system 10, the operating system of the PC 12 may require that the serial number string returned in the standard device descriptor for each printer be unique. For example, if the printers are identical products manufactured by a single manufacturer, all printers will have the same vendor identification number ("idVendor") and product identification number ("idProduct") in the standard device descriptor returned to the USB host during configuration.

While it is possible to store a product serial number in a nonvolatile memory of the printer as part of the manufacturing process, such an additional step may add in an undesirable cost or complexity to the printer. Therefore, in the first embodiment of the present invention the serial number string included with the standard device descriptor message for the USB printer during configuration is derived from some other source and is not directly related to the product's actual serial number.

Figure 2:
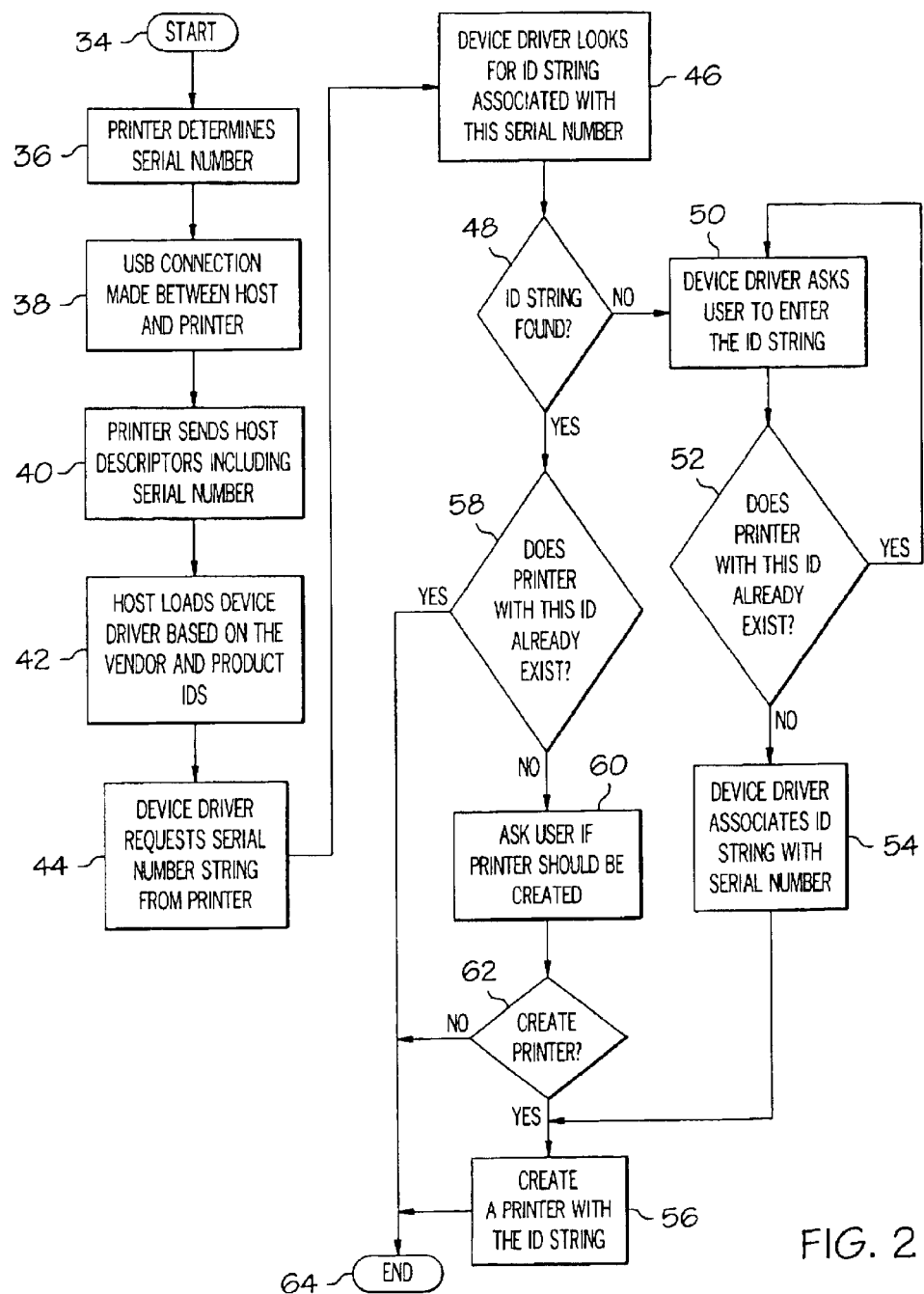
FIG. 2 is a flow diagram representation of a method for configuring a USB printer to a USB system according to an embodiment of the present invention.

As shown in FIG. 2, a first process for configuring a USB printer to a USB system is provided. Operation starts at step 34, in which power is applied to the USB printer. In step 36, the USB printer determines its own serial number or other unique identification number as will be described in detail below. If the USB printer is connected to an active USB host, then connection with a USB host is established immediately; otherwise, as shown in step 38, the user connects the USB printer to the USB host at some time in the future. As shown in step 40, during configuration of the USB printer to the USB host, the USB printer will transmit to the USB host configuration data, which includes device descriptors. Such device descriptors will include a Product ID assigned by the manufacturer ("idProduct"), a Vendor ID assigned by USB ("idVendor"), an index to a String Descriptor which describes the manufacturer ("iManufacturer"), an index to a String Descriptor describing the product ("iProduct") and an index to a String Descriptor describing the device's serial number ("iSerialNumber"). As will be discussed in detailed below, the serial number sent with the USB printers device descriptors may be a serial number for the printer or some other unique identification number/code. As shown in step 42, utilizing the Vendor ID and Product ID device descriptors transmitted by the USB printer during configuration, the USB host will load the appropriate device driver for the USB printer. Thereafter, control will be passed from the USB host operating system to the loaded device driver software.

As shown in step 44, the device driver running on the USB host will utilize the string descriptor index ("iSerialNumber") passed from the USB printer to read the serial number string from the USB printer. In step 46, the device driver operating on the USB host will look for an identification string associated with this serial number string in a database contained on the USB host. The database is preferably maintained in non-volatile memory on the USB host, such as on a hard disk drive of the host. If the serial number string is not found in the database, the device driver will prompt the user to enter into a user interface an identification string for this USB printer. The identification string could be the serial number of the printer or any other string that is meaningful to the user. For example, the user could use "on shelf" as the identifier for a printer on the user's shelf to distinguish it from the printer on the user's desk. The device driver may also provide suggestions to the user on the user interface for an identifier string based upon information sent by the USB printer in the device descriptor data. Such suggested identifier strings could include information related to the product, manufacturer and/or serial number of the USB printer. The user interface could be adapted to allow the user to modify this suggested string, and of course, completely replace it with his or her preferred identifier string.

As shown in step 52, the device driver will check in the database to see if the identification string entered by the user is already in use. If in use, the processor will return to step 50 and ask the user to reenter a new identifier string. If not in use, as shown in step 54, the device driver will enter this identifier string into the database and will associate this identifier string with the serial number string that is indexed by the USB printer's serial number string descriptor index. From step 54, the process then advances to step 56, in which the device driver creates a selectable printer for the USB host using the identifier string appended to the printer name. For example, if the printer name is "Lexmark XYZ" and the identification string is "on shelf" the driver would then create a printer named "Lexmark XYZ on shelf." This name would be seen on a selectable icon in the printer's folder and in the printer list in the print dialog box for most Windows® applications.

Figure 6:
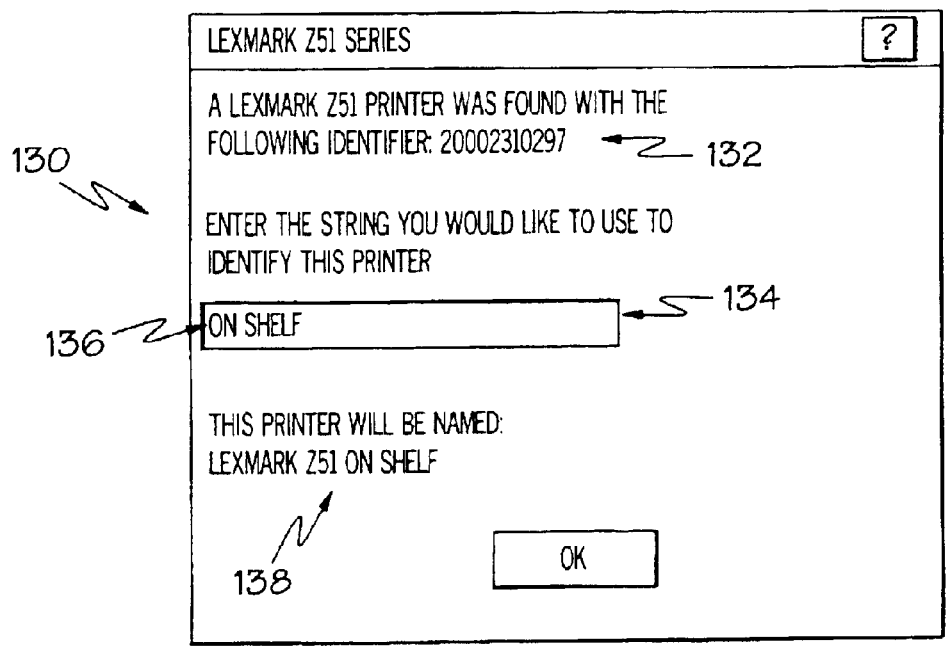
FIG. 6 is a depiction of a graphical user interface display on a USB host from which the user may enter an identification string for a USB printer coupled to the USB host.

For example, as shown in FIG. 6, a graphical user interface provided by the Lexmark® Z51 device driver includes a dialog box 130 that displays the identification number 132 and provides an edit field 134 into which the user may enter an identification string 136 to be associated with the printer. In this example, the identification string 136 entered by the user is "On Shelf." Once entered, the device driver adds the name of the printer ("Lexmark Z51") before the identification string 136 entered by the user to create the identifier "Lexmark Z51 On Shelf" 138.

Returning to step 48, if the device driver finds an identification string associated with the serial number string in the database, then the device driver checks to see if a printer named with the combination of the name and appended identifier string exists in the operating system (step 58). If it does not, the process advances to step 60 in which the device driver prompts the user on a user interface to indicate whether or not the printer should be created. In step 62, the device driver assesses the user's response. If the user responds that the printer should be created, the process advances to step 56 in which the device driver creates the printer as described above. Otherwise, the process advances to its end, step 64. Returning to step 58, if a printer already exists, the process advances to its end at step 64.

Figure 3:
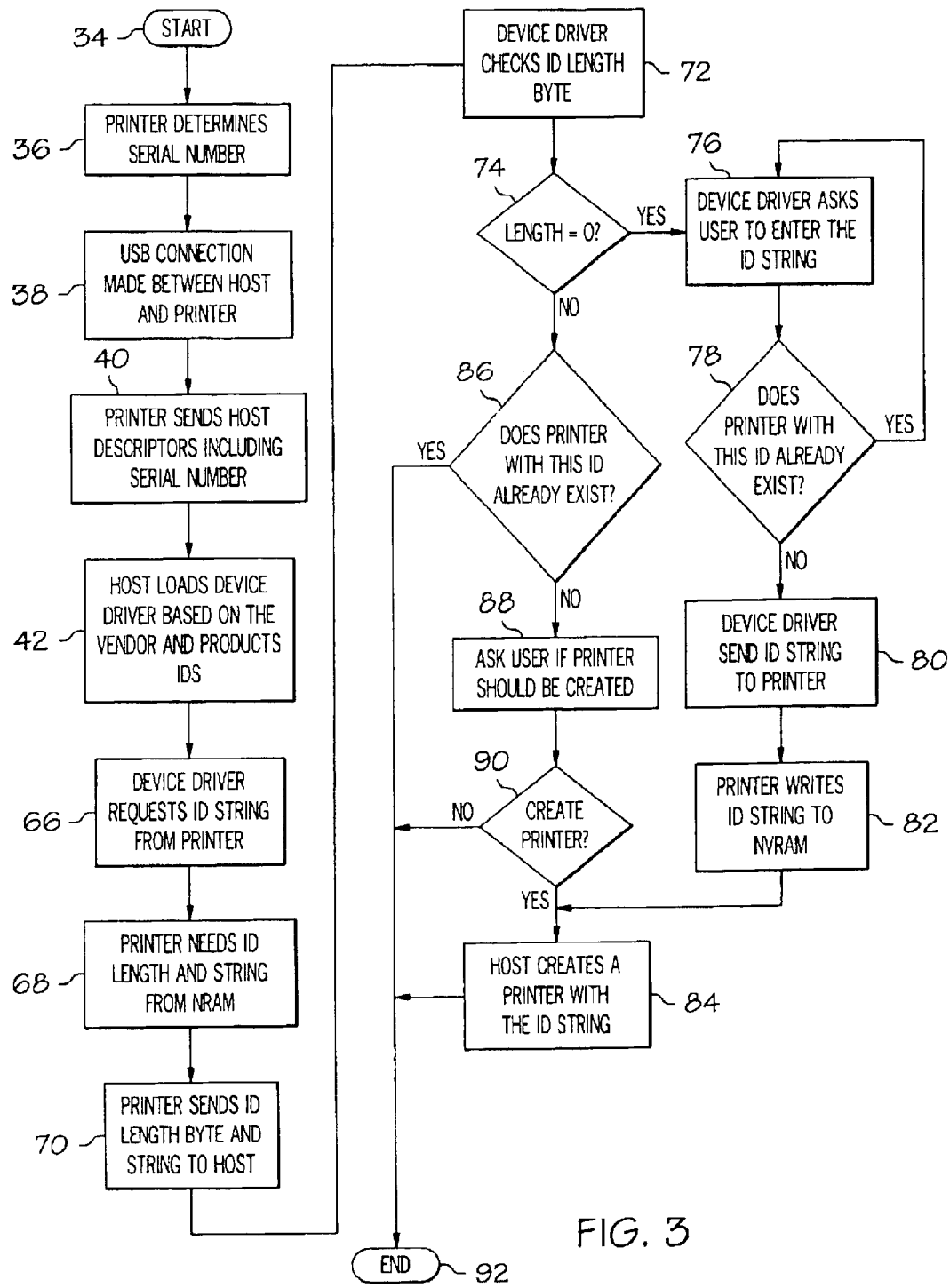
FIG. 3 is a flow diagram representation of a method for configuring a USB printer to a USB system according to another embodiment of the present invention.

FIG. 3 illustrates an alternate USB printer configuration process, in which the printer identification string provided by the user will be stored in non-volatile memory (e.g., EEPROM) on the USB printer. The advantage of this alternate method is that the identification string entered by the user will stay with the printer if the printer is moved to a different USB host. Steps 34–42 are identical to the like-numbered steps illustrated in FIG. 2, described above.

In step 66, the device driver operating on the USB host requests the identification string from the USB printer. In step 68, the USB printer reads the identification string's length and the identification string from its non-volatile memory; and in step 70 the USB printer sends this information to the USB host. In step 72, the device driver operating on the USB host checks the identification string's length. The USB printer is manufactured with a 0-length identification string. Therefore, a length of 0 returned by the USB printer notifies the device driver that the identification string has not yet been set. Accordingly, in step 74, if the length of the identification string is 0, the process advances to step 76 in which the device driver requests that the user enter an identification string into an appropriate user interface. Advancing to step 78, the device driver checks to see if this identification string is already in use. If so, the process returns to step 76 where the device driver asks for a new identification string. If the identification string is unique, the process advances to step 80 in which the device driver will send this identification string to the USB printer, and in step 82, the USB printer will write this identification string, along with its length to non-volatile memory in the USB printer. Advancing to step 84, the device driver will then create a printer on its operating system using this identifier string appended to the printer name as described above (see step 56 in FIG. 2).

If in step 74, the device driver determines that the length of the identification string is not equal to 0, then the process will advance to step 86 to determine whether or not this identification string already exists. If it does not, the process advances to step 88 in which the device driver queries to the user whether or not this printer should be created for the operating system. In step 90, if the user responds that a printer should be created, the process advances to step 84 to create a printer for the operating system, and if the user responds that the printer should not be created, the process advances to the end of the process, step 92. Likewise, in step 86, if the device driver determines that a printer with the particular identification string already exists, then the process advances to the end, step 92.

Once the USB printers have been defined by one of the methods described above, the user will be able to select between the defined USB printers based upon the identification strings entered by the user. For example, as shown in the dialog box 140 of FIG. 7 (accessible in the Windows 98® operating system by clicking on the "Start" button, followed by selecting "Settings" and then selecting "Printers"), the user will be able to select as the default printer, the USB printer defined as "Lexmark Z51 On Desk" 142 and the USB printer defined as "Lexmark Z51 On Shelf" 144. In the present example, the USB printer defined as "Lexmark Z51 On Shelf" 144 is selected.

Figure 7:
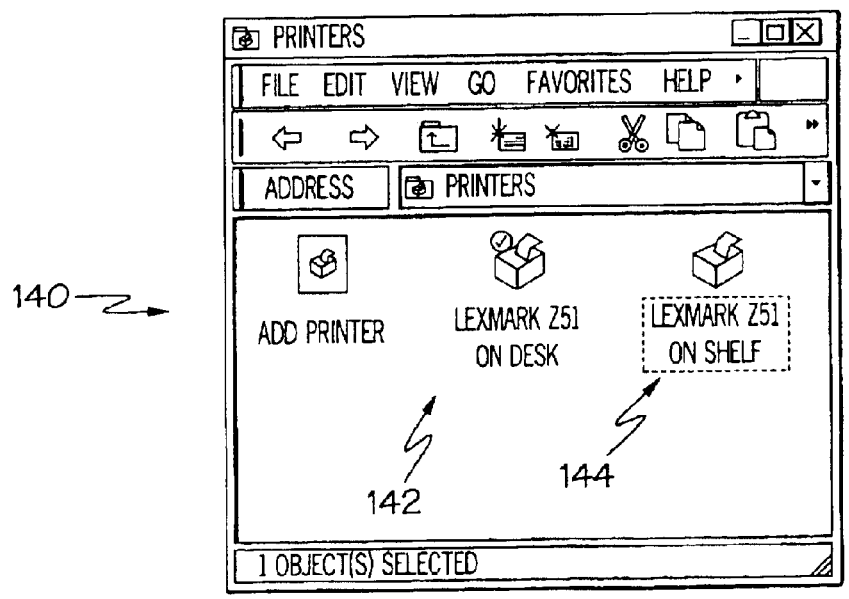
FIG. 7 is a depiction of a graphical user interface display on a USB host from which the user may select one from a pair of USB printers, both of which have been assigned identification strings by the user according to an embodiment of the present invention.
Figure 8:
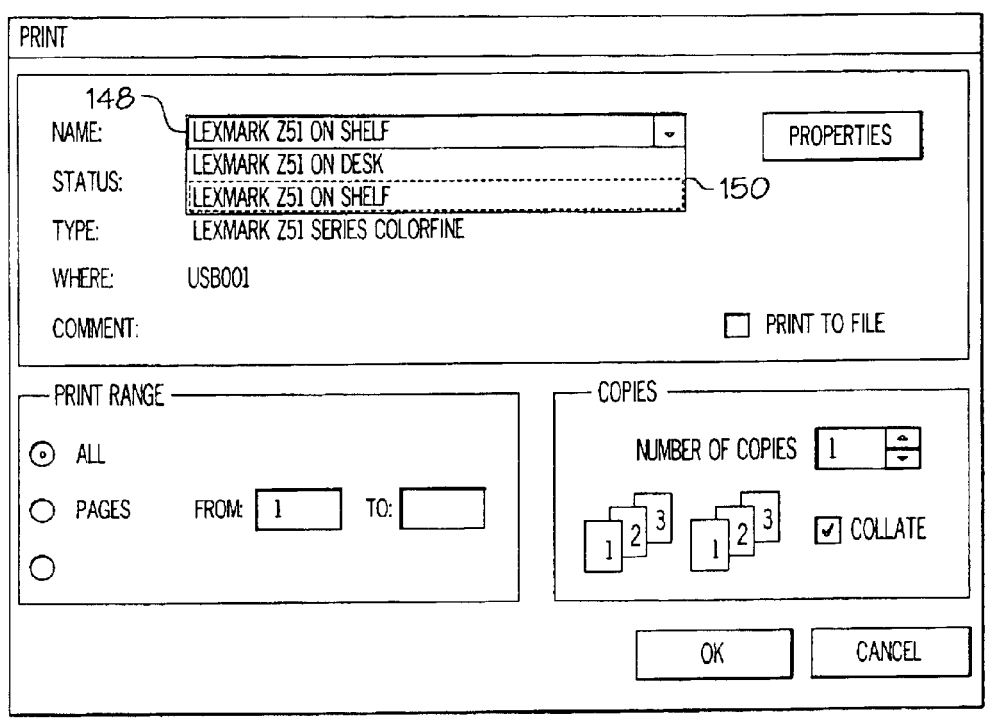
FIG. 8, is a depiction of a graphical user interface display on a USB host from which the user may select to print on one of a pair of USB printers, both of which have been assigned identification strings by the user according to an embodiment of the present invention.

Additionally, once the USB printers have been defined by one of the methods described above, the user will be able to select a particular USB printer to print to. For example, as shown in the dialog box 146 of FIG. 8 (when the user selects "Print" from the "File" menu), the "Name" field 148 will indicate that the "Lexmark Z51 On Shelf" is the default printer since it was previously designated as the default printer (FIG. 7). However, the "Name" field 148 provides a drop-down menu 150 from which the user may select between the printer defined as "Lexmark Z51 On Shelf" and "Lexmark Z51 On Desk".

Figure 4:
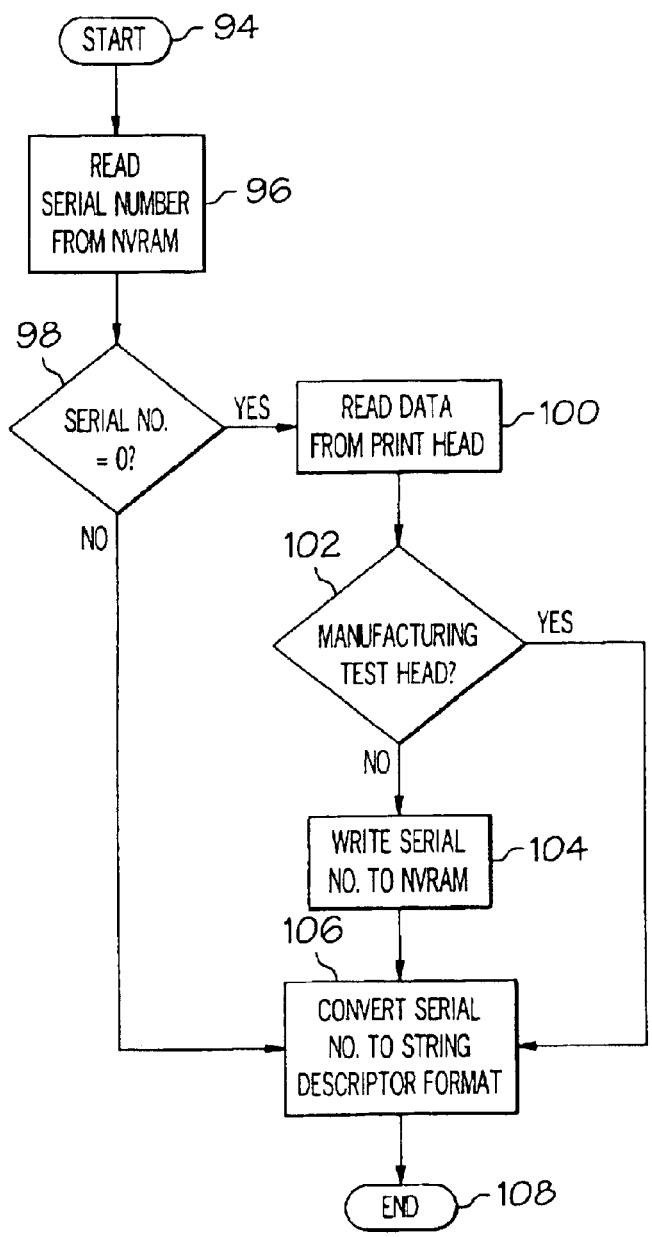
FIG. 4 is a flow diagram representation of a method for determining a unique identification number string by a USB printer according to an embodiment of the present invention.

FIG. 4 provides a flow diagram illustrating a process in which the USB printer determines its serial number string, which is illustrated as step 36 in the processes illustrated in FIGS. 2 and 3. The process starts at step 94 and proceeds to step 96 where the USB printer will read the serial number string from its internal non-volatile memory. During manufacturing of the printer, the non-volatile memory is set to a constant value to indicate that a serial number has not been set. In an exemplary embodiment, the non-volatile memory corresponding to the serial number string is set to all zeros during manufacturing of the USB printer. Therefore, in step 98, the USB printer will check if the serial number read from the non-volatile memory is set to all zeros. If the serial number string is set to all zeroes, the process advances to step 100 where the USB printer will read data from its printhead (such as a serial number for the printhead) that includes a unique value. Preferably, the printhead contains non-volatile memory that is programmed as part of its manufacture. Such data includes the date of manufacture and the serial number for that day. The combination of this information creates a unique identifier.

During manufacture of the USB printer, print tests may be performed using a manufacturing-test printhead, which is not the printhead that will not be shipped with the final product. Therefore, to prevent the USB printer from obtaining its unique identifier from the manufacturing-test printhead (which would result in multiple printers having the same serial number), the manufacturing-test printheads are given a special identifier. In step 102, the USB printer checks for this manufacturing-test printhead identifier. If the serial number in non-volatile memory is not a manufacturing-test printhead, the process advances to step 104, where the USB printer writes the unique identifier from the printhead to non-volatile memory on the USB printer. From step 104, the process advances to step 106, where the USB printer will convert the unique identifier using a standard format and encoded using UNICODE. From step 106 the process ends at step 108.

If, in step 98, the USB printer determines that the serial number string is not all zeroes, then the process advances to step 106 to convert the unique identifier to a string descriptor format. If in step 102, the USB printer determines that a manufacturing-test printhead exists, the process advances to step 106 to convert this manufacturing-test head data to a string descriptor format (the unique identifier data from the manufacturing-test head is not written to the non-volatile memory in the USB printer).

Preferably, the unique identifier from the printhead is stored in the USB printer's non-volatile memory because a printhead is only semi-permanent. That is, some users will replace the printhead during the life of the printer. In such a case, if the identifier were not stored in non-volatile memory, then the unique identifier data from the printhead would change with the new printhead. If this were the case, the user would need to set up the printer again (i.e., repeating the processes set forth in FIGS. 2 and 3).

In a method related to that as set forth in FIG. 4, the USB printer utilizes unique identification data from an alternate component of the USB printer. Such an alternate component could be a temperature sensor, such as the DS 1820 made by Dallas Semiconductor®.

Figure 5:
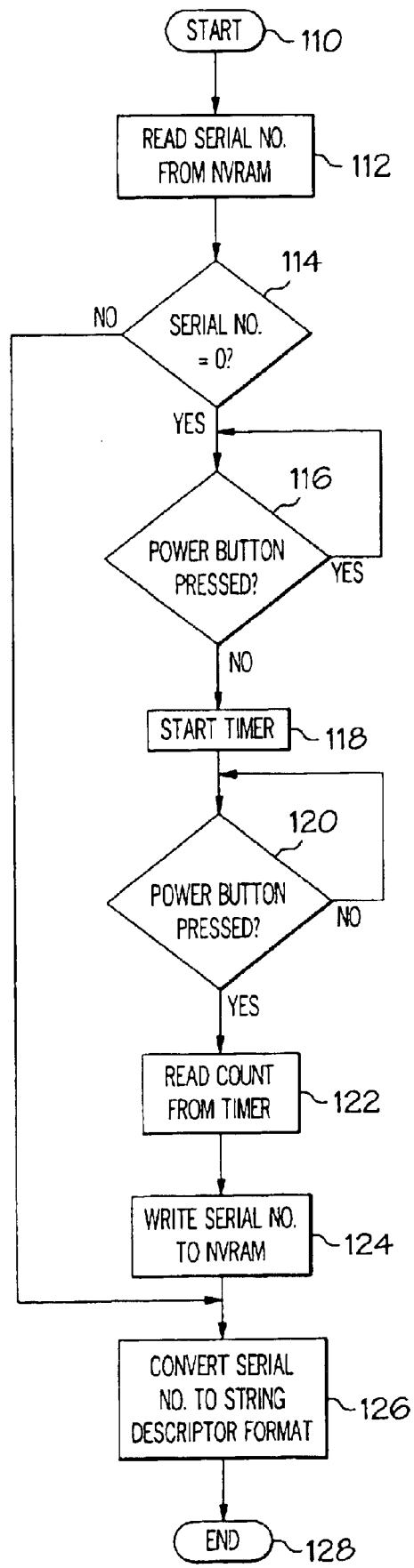
FIG. 5 is a flow diagram representation of a method for determining a unique identification number string by a USB printer according to another embodiment of the present invention.

An alternate process for establishing a unique identification number for a USB printer is provided in FIG. 5. This method uses the variability of the user to create such a unique identifier. Generally, the process involves the USB printer utilizing a counter running on the clock produced by its oscillator to time the period from the end of a first event occurring in the USB printer to a second, user-initiated event. Preferably, the first event is the end of the power-on reset and the second, user initiated event is a power button press by the user. This is possible because the USB printer's electronics are in operation any time the power is supplied to the printer. Only some operations are shut down when power is "off." The operation starts at step 110. In step 112, the USB printer reads the serial number string from non-volatile memory of the USB printer. Preferably, the non-volatile memory is set during manufacturing to a constant value to indicate that the serial number has not been set. In this example, the non-volatile memory is set to all zeroes during the manufacture of the USB printer. Therefore, in step 114, the process checks to see if the non-volatile memory is set to all zeroes. If all zeroes, the process advances to step 116 where the printer checks to see if the power button is pressed. This would be the case if power were applied to the printer with the power button pressed. The situation is avoided because it could result in duplicate serial numbers. Therefore, step 116 is a "wait" step where the printer will wait until the power button is released. Once the power button is released, the process advances to step 118, in which it starts the timer. Advancing to step 120, the printer will then wait until the power button is pressed by the user to turn "on" the printer. When the printer detects the power button pressed by the user, the process advances to step 122, where the printer reads the count from the counter/timer. Advancing to step 124, the printer then loads this count, which is now the unique identification number, into non-volatile memory. Advancing to step 126, the printer converts this unique identification number to the USB string format, and the process then ends at step 128.

If, at step 114, the printer determines that the serial number in non-volatile memory is not all zeroes, then the printer knows that a serial number has previously been set, so it advances to step 126 to convert the serial number in non-volatile memory to the USB string format.

A reasonable timer for the operation is a 40-bit counter running on the printer's 48 megahertz clock. Such a timer would rollover after approximately 381 hours.

While the invention has been described above in detail according to its preferred embodiments, it will be apparent to those having ordinary skill in the art that changes may be made to the invention without departing from the scope of the invention. For example, while the preferred embodiments described above pertain to the configuration of USB printers to a USB system, it will be clear to one having ordinary skill in the art that it is within the scope of the invention to apply the methods described herein to other types of USB devices (whether they be USB peripherals, USB hubs, or combination USB peripheral/hubs), and to other types of host/peripheral systems, whether or not such systems are analogous to a USB system.

What is claimed is:

1. A method for communicating a host computer to a peripheral device, the method comprising the steps of:
   coupling the peripheral device to the host computer;
   transmitting a unique identification code from the peripheral device to the host computer;
   accessing from memory by the host computer an identification string corresponding to the unique identification code, the identification string being previously customized by a user of the host computer during an initialization process for the peripheral device; and
   displaying at least a portion of the identification string on a user interface of the host computer, wherein a user may select the peripheral device by activating an item associated with the portion of the identification string on the user interface.

2. The method of claim 1, wherein the unique identification code is a serial number.

3. A method for communicating a host computer to a peripheral device, the method comprising the steps of:
   coupling the peripheral device to the host computer;
   transmitting a unique identification code from the peripheral device to the host computer;
   accessing from memory by the host computer an identification string corresponding to the unique identification code, the identification string being previously entered by a user of the host computer during an initialization process for the peripheral device; and
   displaying at least a portion of the identification string on a user interface of the host computer, wherein a user may select the peripheral device by activating an item associated with the portion of the identification string on the user interface;
   wherein the unique identification code is a serial number taken from a component of the peripheral device.

4. The method of claim 3, wherein the peripheral device is a printer and the component is a print head installed in the printer.

5. The method of claim 3, wherein the peripheral device is a printer and the component is a sensor installed in the printer.

6. The method of claim 5, wherein the sensor is a heat sensor.

7. A method for communicating a host computer to a peripheral device, the method comprising the steps of:
   coupling the peripheral device to the host computer;
   transmitting a unique identification code from the peripheral device to the host computer;
   accessing from memory by the host computer an identification string corresponding to the unique identification code, the identification string being previously entered by a user of the host computer during an initialization process for the peripheral device; and
   displaying at least a portion of the identification string on a user interface of the host computer, wherein a user may select the peripheral device by activating an item associated with the portion of the identification string on the user interface;
   wherein the unique identification code is a product of a random number generator in the peripheral device.

8. The method of claim 7, wherein the unique identification code is calculated according to a time lapse between power application to the peripheral device and a second, user-initiated event detected by the peripheral device.

9. The method of claim 8; wherein the second, user-initiated event includes the step of a user activating a power-on switch on the peripheral device.

10. A method for communicating a host computer to a peripheral device, the method comprising the steps of:
    coupling the peripheral device to the host computer;
    transmitting the unique identification code from the peripheral device to the host computer;
    accessing from memory by the host computer an identification string corresponding to the unique identification code, the identification string being previously entered by a user of the host computer during an initialization process for the peripheral device; and
    displaying at least a portion of the identification string on a user interface of the host computer, wherein a user may select the peripheral device by activating an item associated with the portion of the identification string on the user interface;
    wherein the method further includes the steps of, prior to the step of transmitting a unique identification code from the peripheral device to the host computer:

testing, by the peripheral device, a location assigned for a unique identification code in a non-volatile memory of the peripheral device;

upon determining that the assigned location includes a predefined invalid identification code, generating a unique identification code by the peripheral device; and placing the unique identification code in the assigned location of the nonvolatile memory by the peripheral device.

11. The method of claim 10, wherein the step generating the unique identification code by the peripheral device includes the step of taking a serial number from a component of the peripheral device.

12. The method of claim 10, wherein the step generating the unique identification code by the peripheral device includes the step of calculating the unique identification code according to a time lapse between power application to the peripheral device and a second, user-initiated event detected by the peripheral device.

13. A method for communicating a host computer to a peripheral device, the method comprising the steps of:

coupling the peripheral device to the host computer;

transmitting a unique identification code from the peripheral device to the host computer;

accessing from memory by the host computer an identification string corresponding to the unique identification code, the identification string being previously entered by a user of the host computer during an initialization process for the peripheral device; and displaying at least a portion of the identification string on a user interface of the host computer, wherein a user may select the peripheral device by activating an item associated with the portion of the identification string on the user interface;

wherein the initialization process includes the steps of:

transmitting a the peripheral device's unique identification code from the peripheral device to the host computer;

checking, by the host computer, for an identification string corresponding to the unique identification code in a memory of the host computer;

responsive to not finding an identification string corresponding to the unique identification code in the checking step, prompting a user to enter into the host computer a user-defined string corresponding to the peripheral device; and storing at least a portion of the user-defined string entered by the user into the memory of the host computer and designating the portion of the user-defined string stored into the memory as the identification string corresponding with the unique identification code.

14. The method of claim 13, wherein the step of prompting the user to enter into the host computer a user-defined string corresponding to the peripheral device includes the step of providing a suggested string by the host computer to the user, the suggested string including at least one of a product name of the peripheral device, a product type of the peripheral device and at least a portion of the unique identification code.

15. A method for communicating a unique identification number from a peripheral device to a host computer comprising the steps of:

copying at least a portion of a serial number from a component in the peripheral device; and transmitting the copied portion of the component serial number to the host computer.

16. The method of claim 15, further including the step of storing the copied portion of the component serial number in a non-volatile memory of the peripheral device, and the transmitting step includes the step of accessing the copied portion of the component serial number from the non-volatile memory.

17. The method of claim 15, wherein the peripheral device is a printer and the component is a print head.

18. The method of claim 17, further including the step of storing the copied portion of the print head serial number in a non-volatile memory of the printer, and the transmitting step includes the step of accessing the copied portion of the print head serial number from the non-volatile memory.

19. The method of claim 15, wherein the peripheral device is a printer and the component is a sensor.

20. The method of claim 19, wherein the sensor is a heat sensor.

21. A method for communicating an identification number for a peripheral device from the peripheral device to a host computer comprising the steps of:

measuring a time lapse between power application to the peripheral device and a second, user-initiated event detected by the peripheral device; and calculating an identification number for the peripheral device from the measured time lapse; and transmitting the identification number from the peripheral device to the host computer.

22. The method of claim 21, wherein the second, user-initiated event includes the step of a user activating a power-on switch on the peripheral device.

23. The method of claim 21, wherein the peripheral device is a printer and the second, user-initiated event includes the step of activating a form-feed switch on the printer.

24. A method for configuring a USB device to a USB host comprising the steps of:

operatively coupling the USB device to the USB host with at least one USB connection;

responsive to a USB host descriptor request to the USB device, the USB device transmitting a unique identification code in a serial-number field of a device descriptor response to the USB host;

accessing from memory an identification string corresponding to the unique identification code, the identifying string being previously customized by a user; and displaying at least a portion of the identification string on a user interface operatively coupled to the USB host along with an item, for activation by a user, for selecting the USB device.

25. A method for configuring a USB device to a USB host comprising the steps of:

operatively coupling the USB device to the USB host with at least one USB connection;

responsive to a USB host descriptor request to the USB device, the USB device transmitting a unique identification code in a serial-number field of a device descriptor response to the USB host;

accessing from memory an identification string corresponding to the unique identification code, the identifying string being previously entered by a user; and displaying at least a portion of the identification string on a user interface operatively coupled to the USB host along with an item, for activation by a user, for selecting the USB device;

wherein the unique identification code is at least a portion of a serial number taken from a component of the USB device.

26. A method for configuring a USB device to a USB host comprising the steps of:
  operatively coupling the USB device to the USB host with at least one USB connection;
  responsive to a USB host descriptor request to the USB device, the USB device transmitting a unique identification code in a serial-number field of a device descriptor response to the USB host;
  accessing from memory an identification string corresponding to the unique identification code, the identifying string being previously entered by a user; and
  displaying at least a portion of the identification string on a user interface operatively coupled to the USB host alone with an item, for activation by a user, for selecting the USB device;
  wherein the unique identification code is calculated from a time lapse between a first event in the USB device and a second, user-initiated event detected by the USB device.

27. A method for configuring a USB device to a USB host comprising the steps of:
  operatively coupling the USB device to the USB host with at least one USB connection;
  responsive to a USB host descriptor request to the USB device, the USB device transmitting a unique identification code in a serial-number field of a device descriptor response to the USB host;
  accessing from memory an identification string corresponding to the unique identification code, the identifying string being previously entered by a user; and
  displaying at least a portion of the identification string on a user interface operatively coupled to the USB host alone with an item for activation by a user, for selecting the USB device;
  wherein the method further includes the steps of, prior to the step of transmitting a unique identification code in a serial-number field of a device descriptor response to the USB host:
  testing, by the USB device, a location assigned for the unique identification code in a non-volatile memory of the USB device;
  upon determining that the assigned location includes a predefined invalid identification code, generating the unique identification code by the USB device; and
  placing the unique identification code in the assigned location of the nonvolatile memory by the USB device.

28. A method for configuring a USB device to a USB host comprising the steps of:
  operatively coupling the USB device to the USB host with at least one USB connection;
  responsive to a USB host descriptor request to the USB device, the USB device transmitting a unique identification code in a serial-number field of a device descriptor response to the USB host;
  accessing from memory an identification string corresponding to the unique identification code, the identifying string being previously entered by a user; and
  displaying at least a portion of the identification string on a user interface operatively coupled to the USB host along with an item, for activation by a user, for selecting the USB device;
  wherein the identifying string is provided by a user during an initialization process for the USB device that includes the steps of:
  transmitting a unique identification code from the USB device to the USB host;
  checking, by the USB host, for an identification string corresponding to the unique identification code in a memory accessible by the USB host;
  responsive to not finding an identification string corresponding to the unique identification code in the checking step, prompting a user to enter into a user interface a user-defined string corresponding to the USB device; and
  storing at least a portion of the user-defined string entered by the user into the memory accessible by USB host and designating the portion of the user-defined string stored into the memory as the identification string corresponding with the unique identification code.

29. A method for configuring a USB device to a USB host comprising the steps of:
  operatively coupling the USB device to the USB host with at least one USB connection; and
  responsive to a USB host descriptor request to the USB device, the USB device copying at least a portion of a serial number from a component in the USB device, and transmitting the copied portion of the component serial number in a serial-number field of a device descriptor response to the USB host.

30. The method of claim 29 further comprising the step of storing the copied portion of the component serial number in a non-volatile memory of the USB device.

31. The method of claim 30, wherein the step of transmitting the copied portion of the component serial number in a serial-number field of a device descriptor response to the USB host includes the step of accessing the copied portion of the component serial number from the non-volatile memory of the USB device.

32. A method for configuring a USB device to a USB host comprising the steps of:
  operatively coupling the USB device to the USB host with at least one USB connection; and
  responsive to a USB host descriptor request to the USB device, the USB device performing the steps of,
  measuring a time lapse between a first event in the USB device and a second, user-initiated event detected by the device;
  calculating an identification number from the measured time lapse; and
  transmitting the identification number in a serial-number field of a device descriptor response to the USB host.

33. The method of claim 32, wherein the first event is a power application to the device.

34. The method of claim 33, wherein the user-initiated event is a step of a user activating a switch on the USB device.

* * * * *